(12) United States Patent
Villar Piqué et al.

(10) Patent No.: US 12,334,821 B2
(45) Date of Patent: Jun. 17, 2025

(54) VOLTAGE CONVERTER

(71) Applicant: NXP B.V., Eindhoven (NL)

(72) Inventors: Gerard Villar Piqué, Eindhoven (NL); Shubham Ajaykumar Khandelwal, Helmond (NL); Ravichandra Karadi, Eindhoven (NL)

(73) Assignee: NXP B.V., Eindhoven (NL)

( * ) Notice: Subject to any disclaimer, the term of this patent is extended or adjusted under 35 U.S.C. 154(b) by 318 days.

(21) Appl. No.: 18/047,053

(22) Filed: Oct. 17, 2022

(65) Prior Publication Data

US 2024/0128866 A1  Apr. 18, 2024

(51) Int. Cl.
*H02M 3/156* (2006.01)
*H02M 1/00* (2006.01)
*H02M 3/158* (2006.01)

(52) U.S. Cl.
CPC ......... *H02M 3/156* (2013.01); *H02M 1/0025* (2021.05); *H02M 3/158* (2013.01)

(58) Field of Classification Search
CPC .... H02M 3/156; H02M 1/0025; H02M 3/158; H02M 1/0003
See application file for complete search history.

(56) References Cited

U.S. PATENT DOCUMENTS

| | | | |
|---|---|---|---|
| 7,782,036 B1 | 8/2010 | Wong et al. | |
| 9,379,606 B2 | 6/2016 | Paul et al. | |
| 10,333,403 B2 | 6/2019 | Huang et al. | |
| 2012/0043949 A1 | 2/2012 | Nakamura | |
| 2012/0223691 A1 | 9/2012 | Weinstein et al. | |
| 2019/0081546 A1 | 3/2019 | Hsu et al. | |
| 2022/0190722 A1* | 6/2022 | Zhang | H02M 1/0032 |
| 2022/0209673 A1* | 6/2022 | Guo | H02M 3/158 |

FOREIGN PATENT DOCUMENTS

EP    3905499 A1    11/2021

OTHER PUBLICATIONS

Jing, Xiaocheng et al.; "A Fast Fixed-Frequency Adaptive-On-Time Boost Converter With Light Load Efficiency Enhancement and Predictable Noise Spectrum"; IEEE Journal of Solid-State Circuits; vol. 48, No. 10; Oct. 2013; pp. 2442-2456.

* cited by examiner

*Primary Examiner* — Adolf D Berhane
*Assistant Examiner* — Afework S Demisse (57) ABSTRACT

One example discloses a voltage converter, including: a power stage configured to generate an output voltage (Vo) and an output current (Jo) based on a switching frequency (fs); a primary control loop configured to vary the switching frequency (fs) in response to an on-time value code (Ton_code) and/or a peak output current code (iLpeak_code); and a secondary control loop configured to generate the Ton_code and/or the iLpeak_code.

19 Claims, 10 Drawing Sheets

VOLTAGE CONVERTER

The present specification relates to systems, methods, apparatuses, devices, articles of manufacture and instructions for switched voltage and/or current conversion.

SUMMARY

According to an example embodiment, a voltage converter, comprising: a power stage configured to generate an output voltage (Vo) and an output current (Jo) based on a switching frequency (fs); a primary control loop configured to vary the switching frequency (fs) in response to an on-time value code (Ton_code) and/or a peak output current code (iLpeak_code); and a secondary control loop configured to generate the Ton_code and/or the iLpeak_code.

In another example embodiment, increasing the Ton_code increases an energy output by the power stage and reduces the switching frequency (fs); and decreasing the Ton_code decreases an energy output by the power stage and increases the switching frequency (fs).

In another example embodiment, the secondary control loop is configured to define a set of forbidden switching frequencies.

In another example embodiment, the secondary control loop is configured to set the Ton_code and/or the iLpeak_code such that the switching frequency (fs) is outside of the set of forbidden switching frequencies.

In another example embodiment, the set of forbidden switching frequencies includes an audio band or a designated noise band.

In another example embodiment, the power stage includes a high-side switch, a low-side switch and a driver circuit; and the driver circuit is configured to control the switches at the switching frequency (fs).

In another example embodiment, the power stage includes an output inductor; the inductor, the output voltage (Vo), and the output current (Io) are configured to be coupled to a load; and the peak output current (iLpeak) is a peak inductor current.

In another example embodiment, the voltage converter is either a DCM (Discontinuous Conduction Mode) voltage converter or a DC-DC voltage converter.

In another example embodiment, the secondary control loop is configured to determine a current on-time value (current_Ton) based on a switching frequency (fs) of the power stage; and the secondary control loop is configured to set a T_high threshold and a T_low threshold.

In another example embodiment, if the switching period, Tp is less than the T_low threshold or greater than the T_high threshold, the secondary control loop adjusts the Ton_code by a first amount until the Tp is between the T_low threshold and the T_high threshold.

In another example embodiment, if Tp is less than the T_low threshold, the secondary control loop adjusts the Ton_code by a first amount until Tp is between the T_low threshold and the T_high threshold; if the Tp is greater than the T_high threshold, the secondary control loop adjusts the Ton_code by a second amount until Tp is between the T_low threshold and the T_high threshold; and the first and second amounts are different.

In another example embodiment, the secondary control loop is configured to set a T_max threshold and a T_min threshold; and the T_max threshold is greater than the T_high threshold, and the T_min threshold is less than the T_low threshold.

In another example embodiment, if Tp is less than the T_Low threshold but greater than the T_min threshold, the secondary control loop adjusts the Ton_code by a first amount until Tp is between the T_low threshold and the T_high threshold; and if the Tp is less than the T_min threshold, the secondary control loop adjusts the Ton_code by a second amount until Tp is between the T_low threshold and the T_min threshold; if Tp is greater than the T_high threshold but less than the T_max threshold, the secondary control loop adjusts the Ton_code by a third amount until Tp is between the T_low threshold and the T_high threshold; and if the Tp is greater than the T_max threshold, the secondary control loop adjusts the Ton_code by a fourth amount until Tp is between the T_max threshold and the T_high threshold; current_Ton keeps on being corrected by the fourth amount until Tp is greater than the T_low threshold and less than the T_high threshold; and the first amount is less than the second amount, and the third amount is less than the fourth amount.

In another example embodiment, the secondary control loop is configured to determine a peak output current (iLpeak_current) based on a switching frequency (fs) of the power stage; and the secondary control loop is configured to define an T_high threshold and an T_low threshold.

In another example embodiment, if Tp is less than the T_low threshold or greater than the T_high threshold, the secondary control loop adjusts the iLpeak_code by a first amount until Tp is between the T_low threshold and the T_high threshold.

In another example embodiment, if Tp is less than the T_low threshold, the secondary control loop adjusts the iLpeak_code by a first amount until Tp is between the T_low threshold and the T_high threshold; if Tp is greater than the T_high threshold, the secondary control loop adjusts the iLpeak_code by a second amount until Tp is between the T_low threshold and the T_high threshold; and the first and second amounts are different.

In another example embodiment, the secondary control loop is configured to set a T_max threshold and a T_min threshold; and the T_max threshold is greater than the T_high threshold, and the T_min threshold is less than the T_low threshold.

In another example embodiment, if Tp is less than the T_Low threshold but greater than the T_min threshold, the secondary control loop adjusts the iLpeak_code by a first amount until Tp is between the T_low threshold and the T_high threshold; and if the Tp is less than the T_min threshold, the secondary control loop adjusts the iLpeak_code by a second amount until Tp is between the T_low threshold and the T_high threshold; if Tp is greater than the T_high threshold but less than the T_max threshold, the secondary control loop adjusts the iLpeak_code by a third amount until Tp is between the T_low threshold and the T_high threshold; and if the Tp is greater than the T_max threshold, the secondary control loop adjusts the iLpeak_code by a fourth amount until Tp is between the T_low threshold and the T_high threshold; and the first amount is less than the second amount, and the third amount is less than the fourth amount.

In another example embodiment, the secondary control loop is configured to generate a switching pulse having a minimum Ton value if the switching frequency (fs) is below a predetermined minimum switching frequency.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

When voltage converters, such as inductive DC-DC voltage converters, need to keep a high efficiency over a wide range of output load currents they are usually operated in a DCM (Discontinuous Conduction Mode). In particular, this is true in mid-to-low power voltage converters.

With the maximum output power being only a few 100 mW, DCM voltage converters are still required to have orders of magnitude output current range across which high efficiency is required.

The switching frequency of a DCM operated DC-DC voltage converter is ideally kept proportional to the output power, so that both conduction and switching losses remain proportional to the output power resulting in a power efficiency which is constant for a very wide range of output power. This range is limited on the high side by the voltage converter entering a CCM (Continuous Conduction Mode) region, and on the low side by the quiescent power of the controller dominating the power losses and causing a drop of the efficiency.

A problem with the above behavior is that in these designs the switching frequency of the voltage converter is proportional to the output current. Thus, the spectrum of the output voltage ripple, input current ripple, inductor current and switching noise are directly dependent on the voltage converter's output power which is, usually, unpredictable.

Additionally, output voltage ripple increases as the output current reduces because the net charge injected to the output capacitor increases as the charge that flows to the load during a pulse of inductor current is less.

The aforementioned problem can be avoided by keeping the voltage converter operating in DCM mode and with a constant switching frequency that is independent of the output current.

However, such a solution requires on-time modulation of the voltage converter's high-side switch so as to provide necessary output voltage regulation in response to load variations. Such a solution however creates a number of undesirable operational characteristics, such as requiring a high enough operating frequency to be able to provide a maximum load current, resulting in too high of switching losses for a minimum load current. Although adapting the size of the power stage, i.e. power stage modulation, to small on-time values for the lowest current might help mitigate this issue, a finite number of available sizes will still decrease efficiency to a certain extent. However, losses due to the body diode conduction, and due to the error in the detection of the zero-crossing of the inductor current will remain, and become more significant at lowest output current.

Similarly, operating at low frequency to achieve high efficiency at the lowest output current, will result in long on-times (and larger inductor peak currents) at high power that will increase the conduction losses in the power stage, decreasing a power efficiency at high output load currents. Again, adaptive sizing of the power stage might help to mitigate the power losses but the unavoidable added parasitic capacitances to switching nodes will increase power losses in case of low output current. Also, on-time control at constant frequency does not provide the fastest possible transient response.

Now discussed is a voltage converter having a variable (i.e. non-constant) switching frequency (fs), resulting in an improved power efficiency over a wide range of output load currents. The voltage converter is also able to limit a magnitude and spectrum of output voltage ripple in low-load conditions as well as overall switching noise. As a result the voltage converter's energy in a programmed set of forbidden switching frequency bands (e.g. audio frequencies) can be minimized. Note, that while in the discussion that follows, an inductor current (iL) is sometimes referred as the output current (Jo) since a DC component of the inductor current (iL) is equal to the output current (Jo). However in other places of the following discussion, the inductor current (iL) and the output current (Jo) are separately described as they flow through different branches of the power converter.

Figure 1:
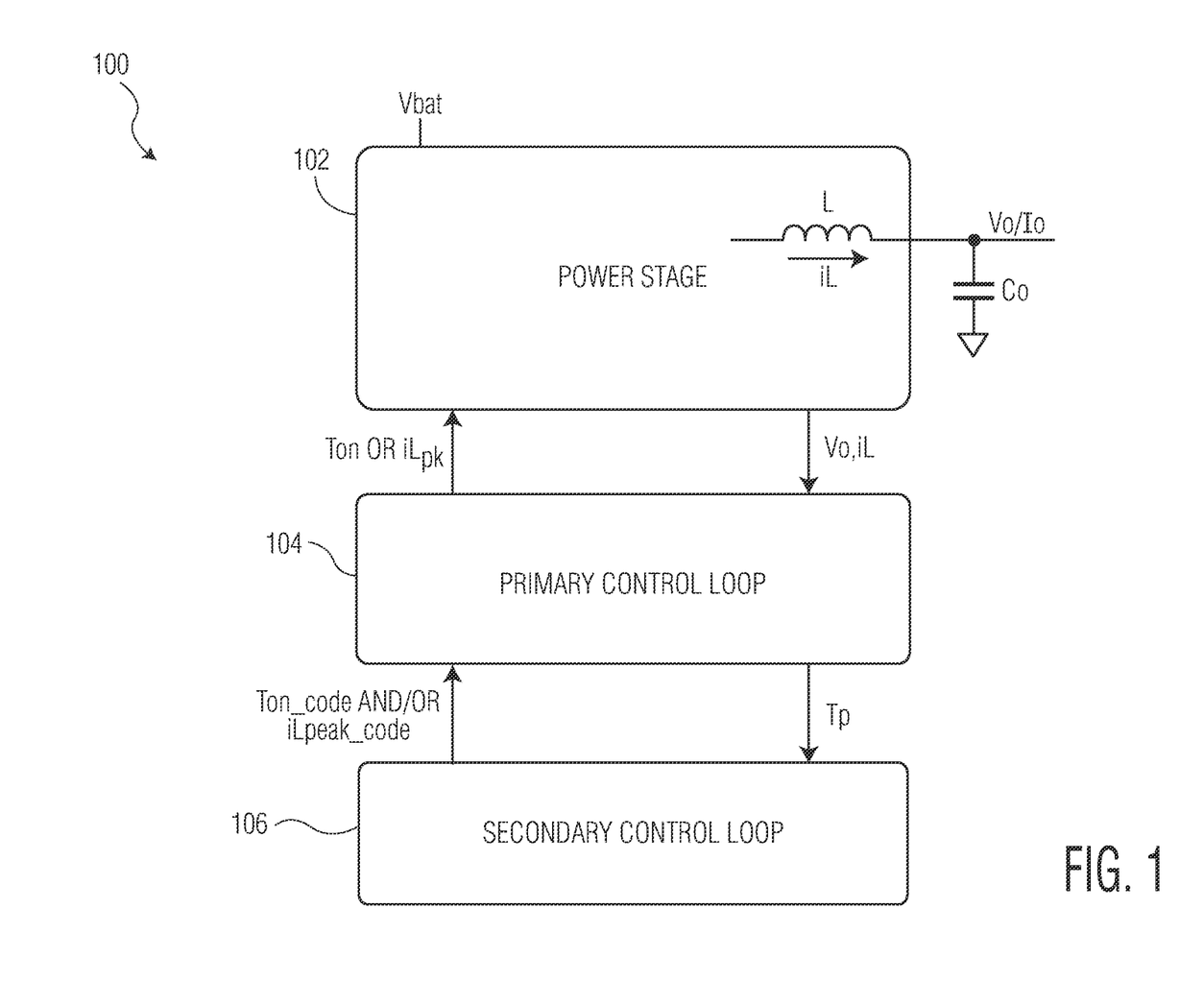
FIG. 1 represents a first example of a voltage converter.

FIG. 1 represents a first example 100 of a voltage converter. The voltage converter includes a power stage 102, a primary control loop 104, and a secondary control loop 106. Also shown are: an inductor (L), an inductor current (iL), an output capacitor (Co), an output voltage (Vo), an output current (Jo), an on-time value (Ton), a current on-time value (current_Ton), a current peak output current (iLpeak_current), an on-time value code (Ton_code), and a peak inductor current code (iLpeak_code), current switching period, T_current.

The primary control loop 104 provides output voltage regulation with variable switching frequency, and the secondary control loop 106 provides switching frequency (fs) regulation via adjustment of either an on-time value (Ton), a peak value of the inductor current (iLpeak), or both.

The secondary control loop 106 measures an instantaneous operating time period (Tp=1/fs) of the power stage 102 and adjusts the on-time value (Ton) code (or the peak current of the inductor code) for the next pulse to keep the current switching period (Tp) value within a predetermine/preselected range.

As is further discussed below, the example 100 voltage converter provides at least the following benefits: confinement of the switching frequency in a particular frequency band, with the consequent cleaner spectrum when compared to free-running PFM control methods to both reduce circuit interference and avoid any forbidden switching frequency bands/range (e.g. audio band); improved power efficiency when compared to a constant-fs primary control loop very fast transient response thanks to the variable-fs primary control loop 104; and reduced output ripple at low-loads when compared to free-running single-boundary hysteretic control loop.

Figure 2:
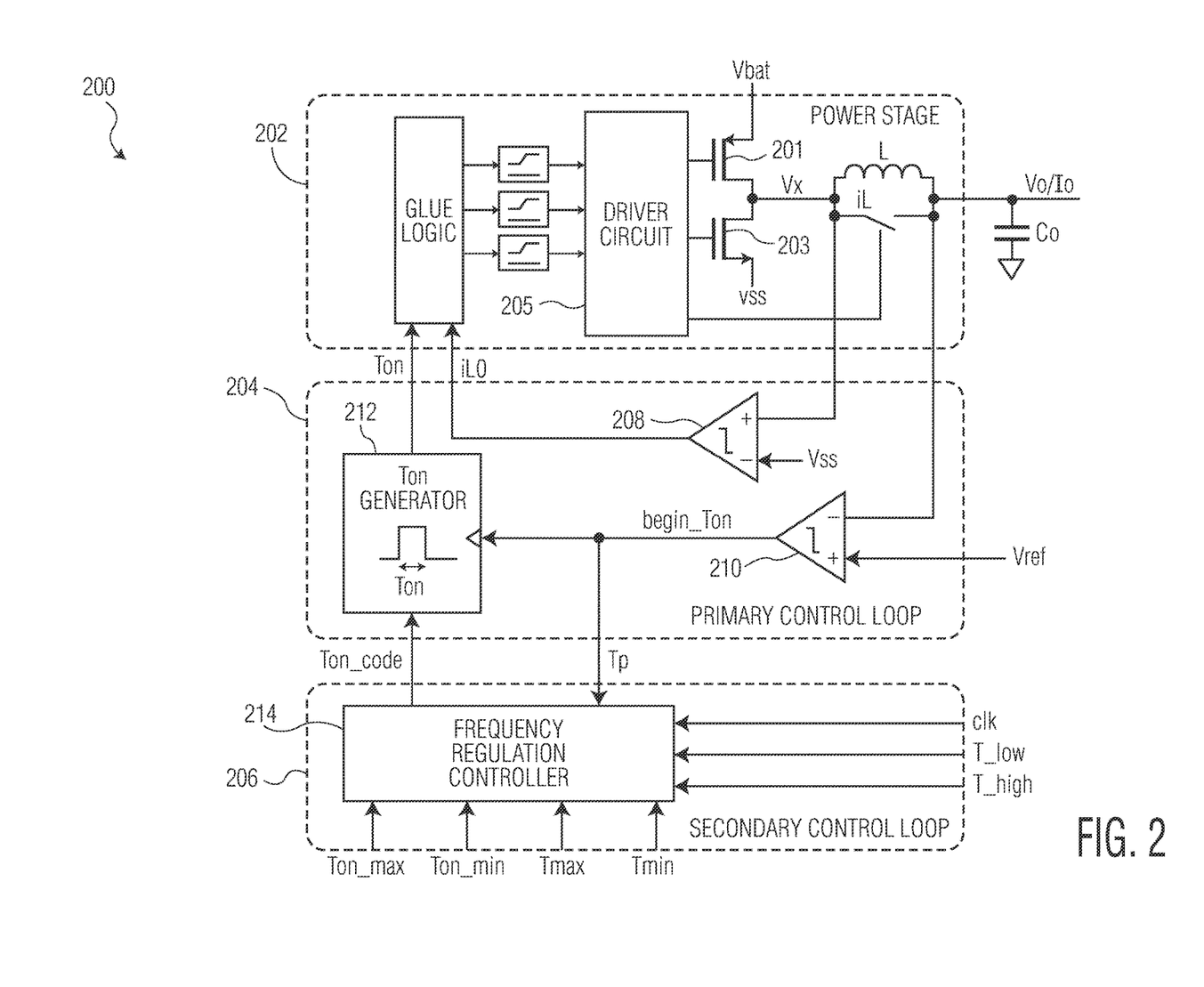
FIG. 2 represents a second example of the voltage converter.

FIG. 2 represents a second example 200 of the voltage converter. While this example embodiment just shows control of the on-time value (Ton) for power stage 202 to realize switching frequency (fs) confinement, an equivalent circuit could be used to control the peak inductor current (iLpeak).

The power stage 202 includes a high-side switch 201 and a low-side switch 203 configured as a buck converter in a mixed-signal implementation and controlled by a driver circuit 205.

The primary control loop 204 in this example is based on a single-boundary hysteretic controller implemented using analog building blocks such as voltage comparators 208, 210 and a Ton generator 212.

The voltage comparator 208 detects when the inductor current (iL) has reached zero (iL0 set to high). iL0 set to high determines an end of a pulse of energy sent to the output of the power stage 202. This is used to implement DCM in synchronous rectification.

The voltage comparator 210 detects when the output voltage (Vo) drops below a reference (Vref). The voltage comparator 210 generates a trigger (begin_Ton) to initiate a new pulse of energy to be sent to the output of the power stage 202.

The Ton generator 212 generates a digital signal that turns on the high side switch 201 of the power stage 202. The digital signal remains high during a commanded on-time value (Ton).

As discussed in FIG. 1, the on-time value (Ton) is configurable and in some example embodiments is determined by 6-bit digital signal Ton_code. The Ton_code can be generated in either analog or digital domains; however, a pure digital implementation of the secondary control loop 206 includes a clock signal with a period as small as a time resolution required for the required measurements of current_Ton. The resolution of the adjustments on Ton is determined by the number of bits of Ton code, and the particular implementation of the Ton Generator block 212. In a fully analog implementation the adjustment of Ton could be continuous (e.g. with a resolution infinitesimally small).

A digital frequency regulation controller 214 in the secondary control loop 206 is configured to measure an instantaneous/current switching period (Tp=1/fs) of the power stage 202 and in response adjusts the on-time value code (Ton_code), to keep the switching frequency (fs=1/T) of the power stage 202 within one or more predetermined/preselected frequency bands (i.e. out of any forbidden bands, such as an audio band).

The predetermined/preselected frequency bands are set by configurable values T_low and T_high, corresponding to the upper and lower boundaries of the frequency band. Additional configurable inputs like Tmin and Tmax can be used to modify the transient response of the secondary control loop 206 when adjusting the switching frequency (fs). In a particular embodiment, the Tmin and Tmax thresholds could be used to apply coarse adjustments to the Ton_code, while T_low and T_high could be used to apply finer adjustments on the Ton_code. Further inputs such as Ton_min and Ton_max, can be used to limit the values of the on-time value (Ton) to further optimize voltage ripple at the output of the power stage 202.

A frequency of the external clock signal (clk) sets a resolution of the real time (i.e. measurements on the instantaneous/current switching period (Tp=1/fs).

In various example embodiments, as long as Ton_code is large enough, the action of the primary control loop 204 becomes independent of the secondary control loop 206, which allows it to keep a fast transient response for many load changes.

Note, in an alternative case using the peak output current (iLpeak) the secondary loop still continues to control current_Ton to keep fs within a specific band. However, the secondary loop does so by modifying the iLpeak value (i.e. iLpeak_code). In this sense, max and min settings for the iLpeak_code are required (iLpeak_max and iLpeak_min), similarly to Ton_max and Ton_min. The rest of the settings (T_low, T_high, Tmin, Tmax) would remain the same.

Figure 3A:
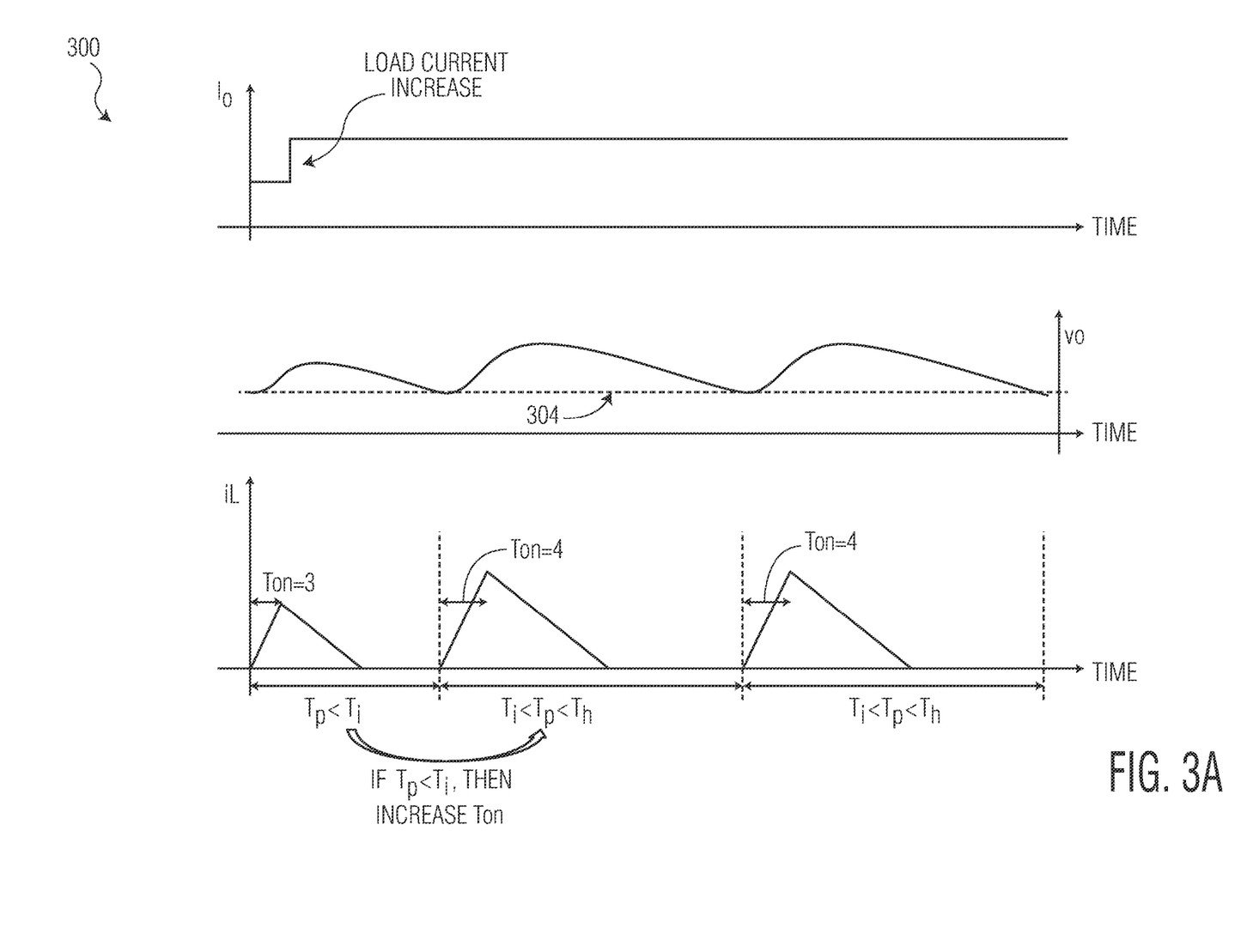
FIG. 3A represents a first example for switching the voltage converter in response to a first load current increase.
Figure 3B:
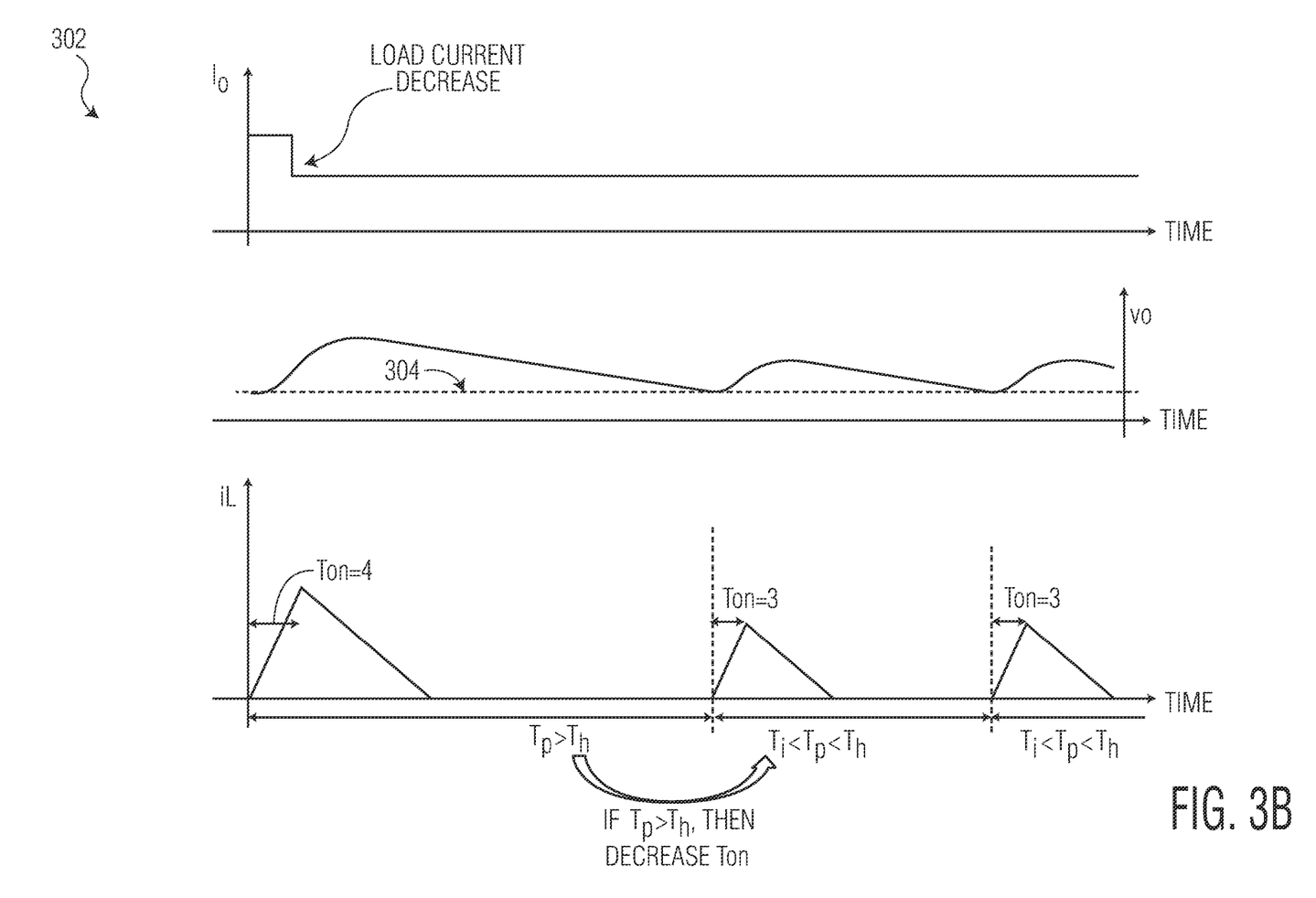
FIG. 3B represents a second example for switching the voltage converter in response to a first load current decrease.

FIG. 3A represents a first example for switching 300 the voltage converter in response to a first load current (Jo) increase (e.g. by a first amount). FIG. 3B represents a second example for switching 302 the voltage converter in response to a first load current (Jo) decrease (e.g. by a second amount). Note, in these example embodiments, Ton changes are commanded by the secondary control loop 106, 206 and their effect on the power stage 102, 202 inductor current (iL) and output voltage (Vo) are shown.

In FIGS. 3A and 3B a threshold reference voltage 304 triggers the primary control loop 104, 204 to command the power stage 102, 202 to generate a new energy/current pulse to a load connected to the output of the power stage 102, 202.

The secondary control loop 106, 206 is configured to confine the switching frequency (fs) and ensure that fs stays out of any forbidden bands (e.g. an audio band, or a designated noise band). To this end, the secondary control loop 106, 206 is configured to monitor a current voltage converter switching period (Tp) and determine whether Tp is greater than a T_low (Tl) threshold and less than a T_high (Th) threshold.

In FIG. 3A, after a load current (Jo) increase, a measured current switching period (Tp) is shorter than the lower threshold (Tl). As a result the secondary control loop 106, 206 increases Ton (using the Ton_code) by a single step from 3 to 4. This results in more energy per pulse output by the power stage 102, 202 and sent to the load, which reduces the switching frequency (fs). As the next switching time, since the current T is within the boundaries set by Tl and Th, no modification of Ton by the secondary control loop 106, 206 is required.

In FIG. 3B, after a load current (Jo) decrease, the measured current switching period (Tp) is longer than the higher threshold (Th). As a result the secondary control loop 106, 206 decreases Ton (using the Ton_code) by a single step from 4 to 3. This results in less energy per pulse output by the power stage 102, 202 and sent to the load, which increases the switching frequency (fs). As the next switching time, since the current T is within the boundaries set by Tl and Th, no modification of Ton by the secondary control loop 106, 206 is required.

While both of these example embodiments use single step changes in Ton (using the Ton_code), greater load current increases or decreases may require greater or more frequent step changes in Ton (using the Ton_code).

In alternate embodiments where the secondary control loop 106, 206 is configured to confine the switching frequency (fs) and ensure that fs stays out of any forbidden bands based on the peak output current (iLpeak), the secondary loop controls current_Ton to keep fs within a specific band by modifying the iLpeak value (i.e. iLpeak_code), otherwise the operation is similar. Such similarity applies to FIGS. 4, 5 and 6 discussed below as well.

Figure 4:
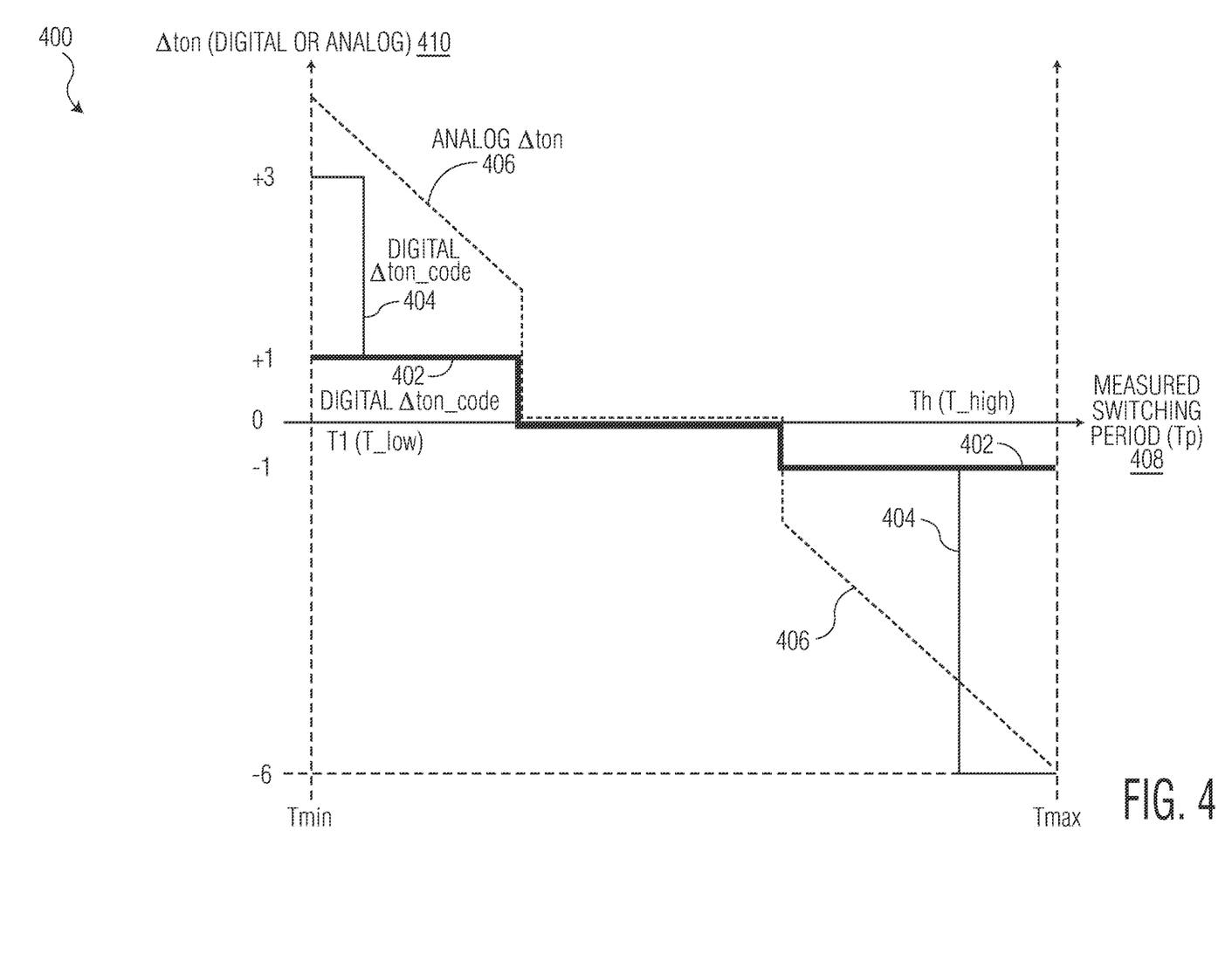
FIG. 4 represents an example set of on-time value (Ton) control laws for controlling the voltage converter in response to different switching period values.

FIG. 4 represents an example set of on-time value (Ton) control laws 400 for switching the voltage converter in response to the measured switching period (T) 408. As shown, these control laws 400 can have any mathematical form (e.g. linear, non-linear, load increase/decrease symmetrical or asymmetrical).

Three example control laws 402, 404, 406 are shown: the on-time code Ton_code, is updated by an increment of Δton_code, depending on the measured switching period Tp 408. These curves are equally applicable to the iL-peak implementation of the voltage converter. Tl (e.g. T_low) and Th (e.g. T_high) switching period threshold limits are shown, as well as Tmax and Tmin thresholds. Note as shown in FIG. 4, control laws 402 and 404 are digital and are defined by a Δton-code, whereas control law 406 is analog and is defined by a continuous variable Δton.

For control law 402, the Ton step changes 410 are symmetrical and smaller (e.g. one step) regardless of the current measured switching period. FIGS. 3A and 3B use control law 402.

For control law 404, the Ton step changes 410 are variable (e.g. one step, three-step, five-step) and asymmetrically dependent on the current measured switching period (T) 408. Control law 404 takes note of the additional Tmax and Tmin thresholds and thus changes Ton by a greater amount when the measured switching period (Tp) 408 is outside of the T_low/T_high range, and changes Ton by a lesser amount when the measured switching period (T) 408 is near or within the T_low/T_high range limits.

For control law 406, the Ton step changes 410 are both linear and steps depending on the current measured switching period (Tp) 408. In the linear region the correction of Ton is proportional to deviation of the measured Tp from the band of interest (i.e. Tp–Th or Tl–Tp).

In all the strategies, keeping a wider "dead-zone" (Th–Tl) relaxes a confinement of the switching frequency (fs) spectrum at the benefit of power efficiency and transient response of the primary loop. On the other hand, a much narrower "dead-zone" would converge to an almost constant switching frequency (fs).

Controlling the dead-zone allows various example embodiments of the voltage converter to trade power efficiency at lower output current by a more confined or not spectrum of the switching activity. Additionally, the inclusion of a "dead-zone" in some example embodiments favors the digital implementation of the invention as it avoids limit cycle oscillations due to the finite time resolution in both Tp measurements and Ton adjustments.

Figure 5A:
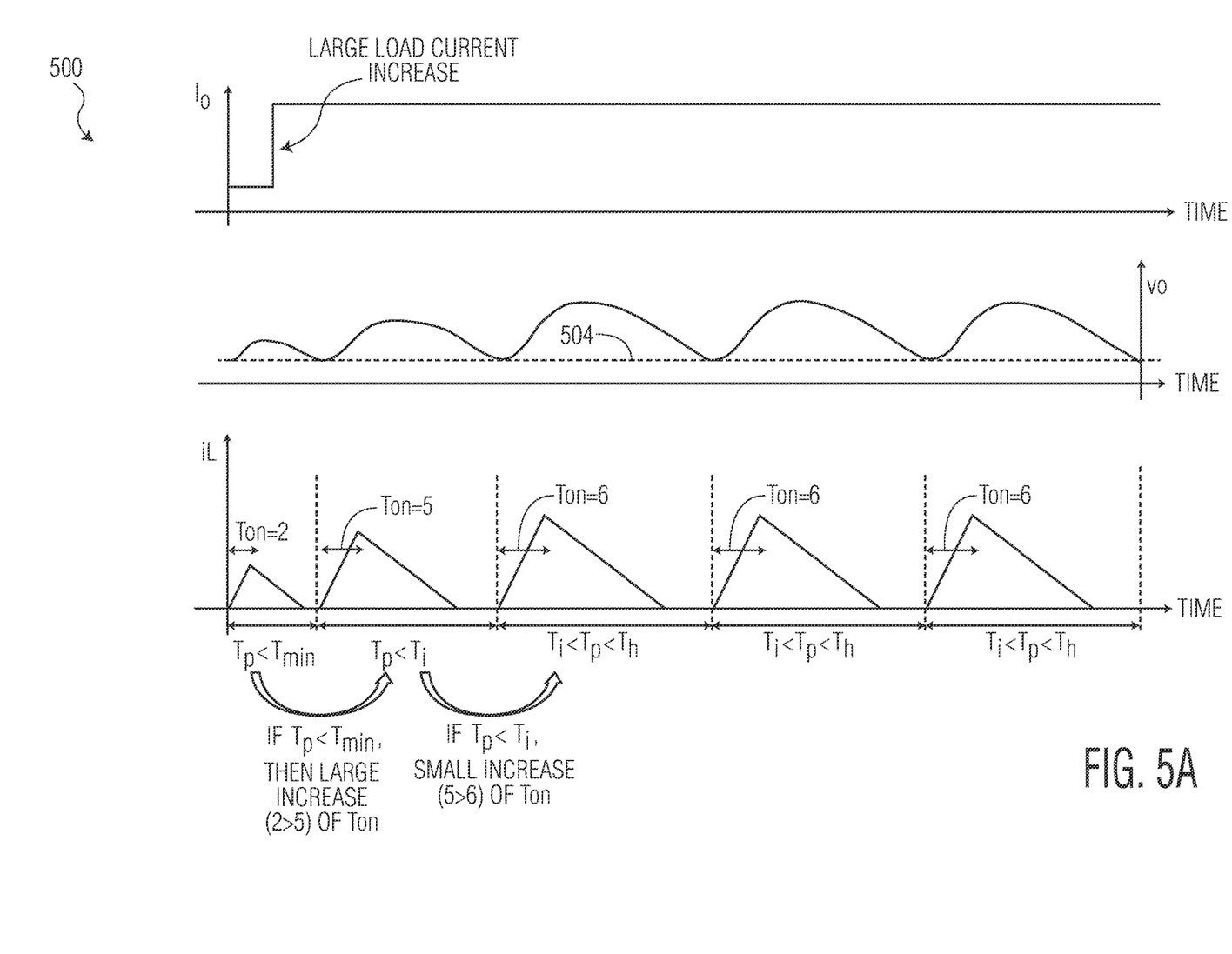
FIG. 5A represents a third example for switching the voltage converter in response to a second load current increase.
Figure 5B:
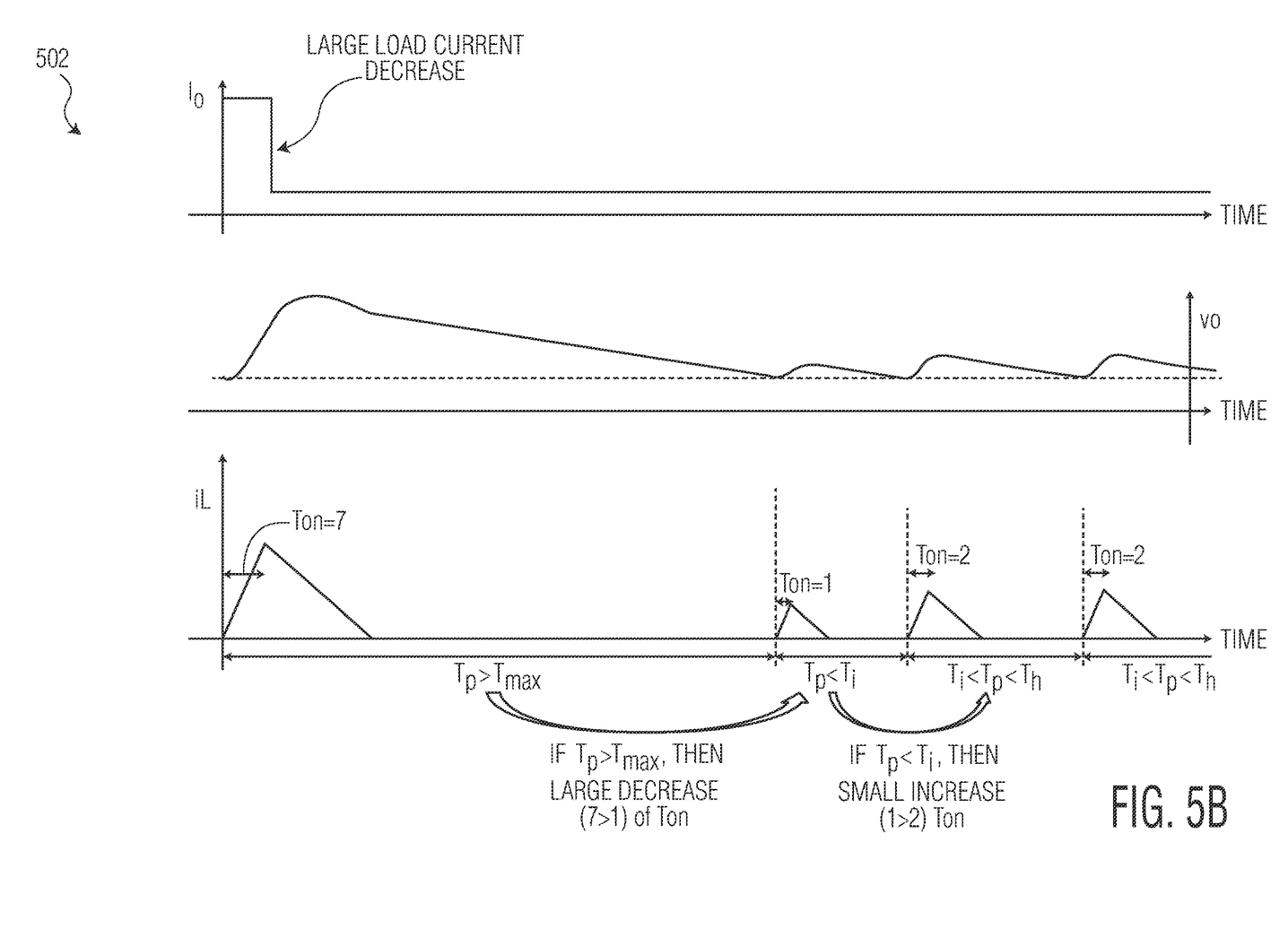
FIG. 5B represents a fourth example for switching the voltage converter in response to a second load current decrease.

FIG. 5A represents a third example for switching 500 the voltage converter in response to a second load current (Jo) increase (e.g. by a third amount). FIG. 5B represents a fourth example for switching 502 the voltage converter in response to a second load current (Jo) decrease (e.g. by a fourth amount). FIGS. 5A and 5B use control law 404.

In FIGS. 5A and 5B a threshold voltage reference 504 triggers the primary control loop 104, 204 to command the power stage 102, 202 to generate a new energy/current pulse to a load connected to the output of the power stage 102, 202.

The secondary control loop 106, 206 is configured to confine the switching frequency (fs) and ensure not only that a current measured switching period (T) stays between the T_low and T_high thresholds, but also that if the current measured switching period (T) gets beyond the additional Tmax and Tmin thresholds that the Ton_code has a greater linear or step change so as to more quickly return the switching frequency (fs) to within the T_low and T_high threshold limits.

In FIG. 5A when there is a sudden large increase of output current the discharge of the output capacitor is much faster and the resulting period is below Tmin, which according to control law 404, demands an increase of Ton from 2 to 5. This quickly increases the switching period to a value between Tmin and Tl, which still increases the Ton value by 1 unit, until this settles to value of 6, satisfying Tl<Tp<Th.

In FIG. 5B, in case of a sudden drop of output current, a period much larger than Tmax is detected, which causes a large reduction of Ton from 7 to 1. However, Ton=1 is not high enough to provide the output current in the desired frequency band. Thus, Tp<Tl is detected and Ton is increased by 1, which settles the loop.

Figure 6:
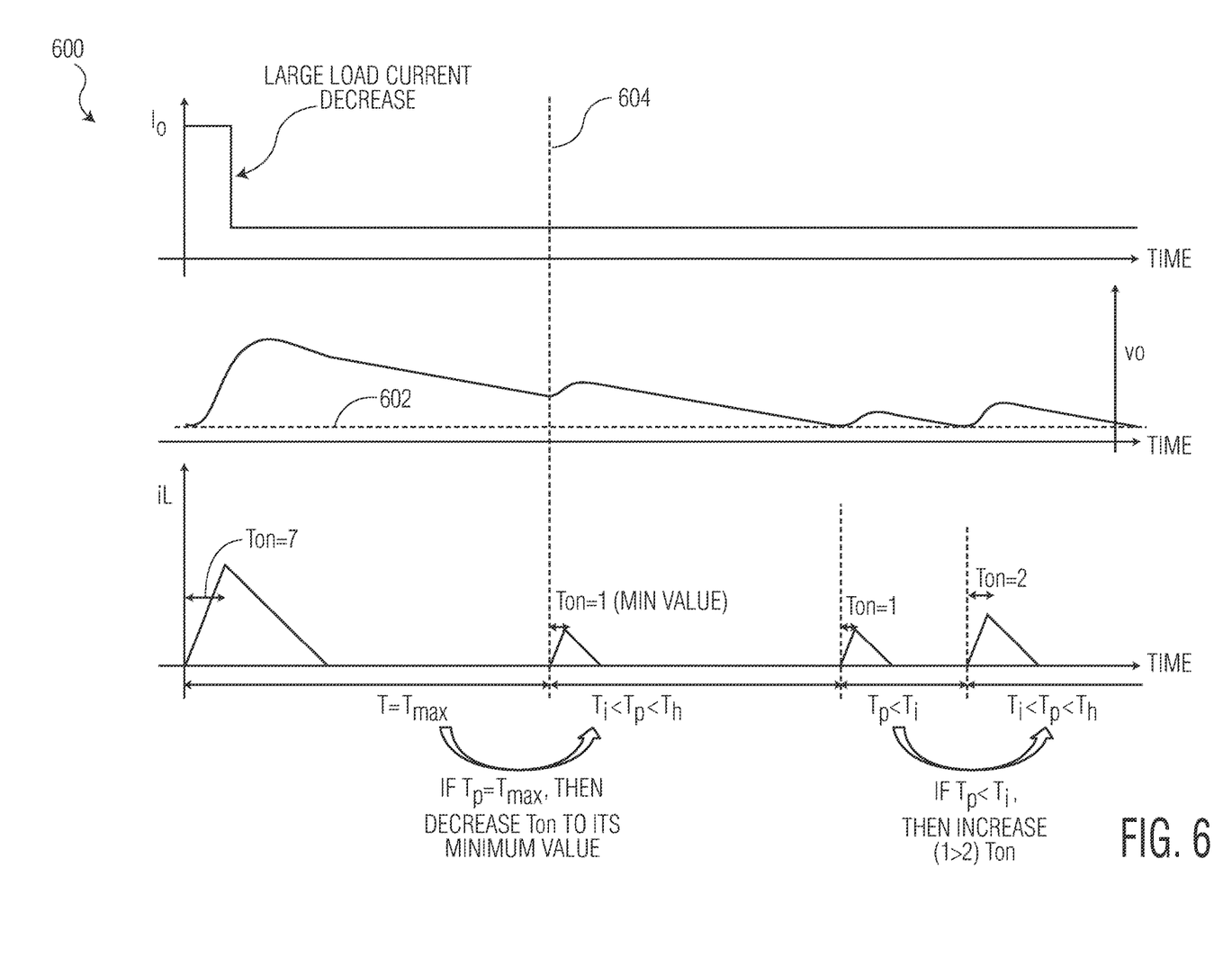
FIG. 6 represents a fifth example for switching the voltage converter in response to a third load current decrease.

FIG. 6 represents a fifth example for switching 600 the voltage converter in response to a third load current decrease. As before, a threshold voltage reference 602 is defined to trigger the primary control loop 104, 204 to command the power stage 102, 202 to generate a new energy/current pulse to a load connected to the output of the power stage 102, 202.

Additionally if Tp>Tmax, the secondary control loop 106, 206 to force another switching pulse with minimum Ton value. This helps preventing a too low of a switching frequency (fs). Thus in case of a large load current decrease, secondary control loop 106, 206 introduces a pulse of energy (corresponding to Ton_min) once T=Tmax, as shown in FIG. 6, to keep fs≥1/Tmax. To guaranteed proper voltage regulation the output power of the voltage converter should be larger than the corresponding to Ton_min at fsmin=1/Tmax.

Figure 7:
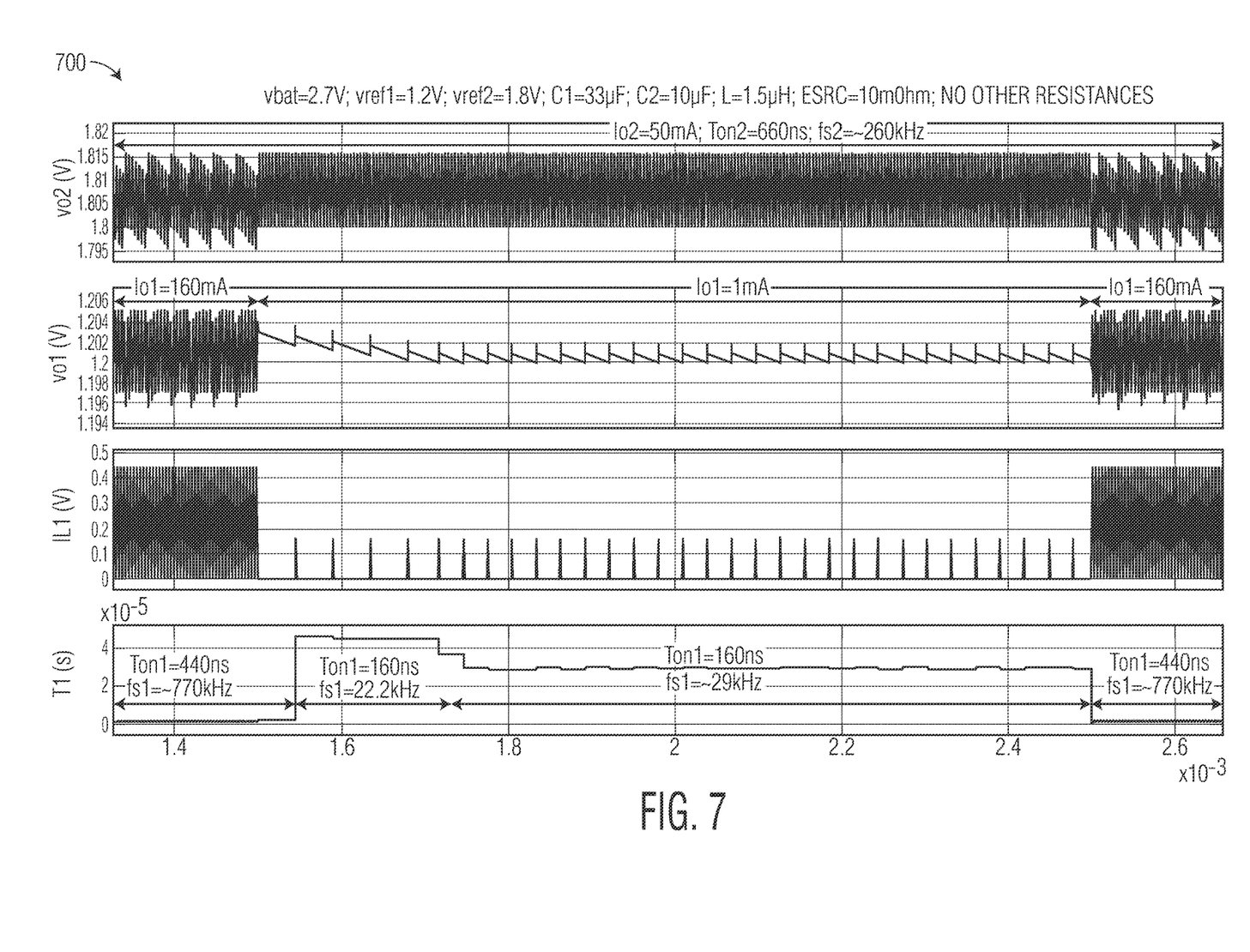
FIG. 7 represents an example simulation for switching the voltage converter in response to load current changes.

FIG. 7 represents an example simulation for switching 700 the voltage converter in response to load current changes. Io1 is the output current and Tl is the switching period and fs1=1/Tl is the switching frequency.

In this particular case, the main target is to avoid that the spectrum of the output ripple falls within the audio band (fs≥22 kHz) or mitigate its presence. Operation of the invention in case of load current steps in 1 output of a SIDO system, with 1-bit resolution of Ton.

Fall and rise load steps (1 mA↔160 mA, in 100 ns) have been applied to the first output vo1=1.2V, while the second output vo2=1.8V is providing its maximum current (50 mA). As observed, the transient response of the loop is very fast, especially in case of sudden current increases. Here, only 2 different values of Ton1={440 ns, 160 ns} are allowed (i.e. only 1 bit of resolution is considered), for the first output.

The second output is keep constant at Ton2=660 ns. The 2 values of Ton1 are reflected also in the inductor current sent to vo1 (actually, there is only 1 inductor in the system as said before, but the waveform is only showing the current pulses sent to vo1).

As can be observed from the waveforms in FIG. 7, as soon as the output current drops and T is increased, the secondary control loop 106, 206 forces small pulses every 45 us (=1/22.2 kHz). As these are not enough to provide Io1=1 mA, vo1 drops until it hits its reference and the frequency is consequently increased to 29 kHz, where Io1=1 mA can be supplied. Then as the output current increases from 1 mA to 160 mA, the switching period decrease below Tl=1 us and the secondary control loop 106, 206 increases Ton1 to 440 ns, while the switching frequency increases up to 770 kHz where the output power needs are satisfied.

Figure 8:
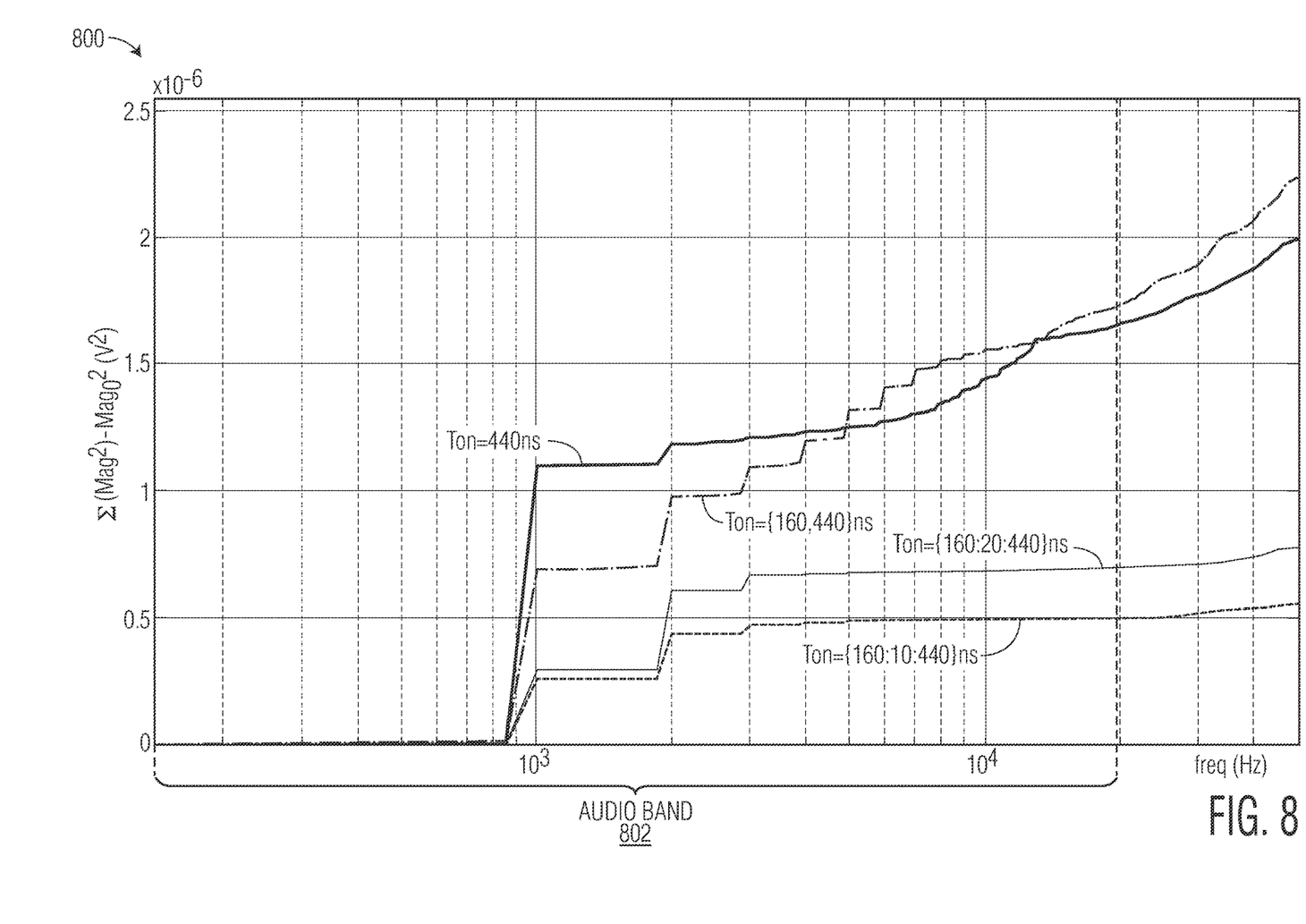
FIG. 8 represents an example reduction of accumulated energy in a forbidden switching frequency range in response to a variation in an on-time value (Ton).

FIG. 8 represents an example reduction of accumulated energy 800 in a forbidden switching frequency range in response to a variation in a on-time value (Ton) based on a 1 kHz-sinusoidal load current.

The y-axis represents an integral of the squared magnitude of the spectrums, after subtracting the square of the magnitude at DC. This is meant to show an estimation of the accumulated energy of the different techniques within the audio band.

FIG. 8 thus shows a reduction of noise and accumulated energy in the audio band 802 (<22 kHz) (i.e. the lowering of the y-axis curve) depending upon the Ton control law used.

Thus in various example embodiments of the voltage converter just discussed, the voltage converter's transient response is on par with free-running PFM control strategies, and is better than constant frequency control methods. Different control strategies/laws that relate the measured switching period (T) to the modification of Ton can be applied to increase this performance.

By allowing a range (i.e. T_low to T_high) for the switching frequency, a power efficiency for a wide range of voltage converter output currents can be improved as compared to voltage converter's having a constant switching frequency (fs), and also keeps a "fundamental" of the switching frequency (fs) out of any forbidden bands of interest.

Although a spectrum of the switching noise when using the voltage converter discussed may not be as clean as in case of using a constant switching frequency (fs), such voltage converters are improved with respect to a free-running PFM constant-Ton control, by confining their operation in a particular frequency band.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A voltage converter, comprising:
a power stage configured to generate an output voltage (Vo) and an output current (Io) based on a switching frequency (fs);
a primary control loop configured to vary the switching frequency (fs) in response to an on-time value code (Ton_code); and a secondary control loop configured to generate the Ton_code;
wherein the secondary control loop is configured to set a T_high threshold and a T_low threshold.

2. The voltage converter of claim 1:
wherein increasing the Ton_code increases an energy output by the power stage and reduces the switching frequency (fs); and
wherein decreasing the Ton_code decreases an energy output by the power stage and increases the switching frequency (fs).

3. The voltage converter of claim 1:
wherein the secondary control loop is configured to define a set of forbidden switching frequencies.

4. The voltage converter of claim 3:
wherein the secondary control loop is configured to set the Ton_code and/or the iLpeak_code such that the switching frequency (fs) is outside of the set of forbidden switching frequencies.

5. The voltage converter of claim 3:
wherein the set of forbidden switching frequencies includes an audio band or a designated noise band.

6. The voltage converter of claim 1:
wherein the power stage includes a high-side switch, a low-side switch and a driver circuit; and
wherein the driver circuit is configured to control the switches at the switching frequency (fs).

7. The voltage converter of claim 1:
wherein the power stage includes an output inductor;
wherein the inductor, the output voltage (Vo), and the output current (Io) are configured to be coupled to a load; and
wherein the peak output current (iLpeak) is a peak inductor current.

8. The voltage converter of claim 1:
wherein the voltage converter is either a DCM (Discontinuous Conduction Mode) voltage converter or a DC-DC voltage converter.

9. The voltage converter of claim 1:
wherein the secondary control loop is configured to determine a current on-time value (current_Ton) based on a switching frequency (fs) of the power stage.

10. The voltage converter of claim 9:
wherein if a switching period (Tp=1/fs) is less than the T_low threshold or greater than the T_high threshold, the secondary control loop adjusts the Ton_code by a first amount until the Tp is between the T_low threshold and the T_high threshold.

11. The voltage converter of claim 9:
wherein if a switching period (Tp=1/fs) is less than the T_low threshold, the secondary control loop adjusts the Ton_code by a first amount until Tp is between the T_low threshold and the T_high threshold;
wherein if the Tp is greater than the T_high threshold, the secondary control loop adjusts the Ton_code by a second amount until Tp is between the T_low threshold and the T_high threshold; and
wherein the first and second amounts are different.

12. The voltage converter of claim 9:
wherein the secondary control loop is configured to set a T_max threshold and a T_min threshold; and
wherein the T_max threshold is greater than the T_high threshold, and the T_min threshold is less than the T_low threshold.

13. The voltage converter of claim 12:
wherein if a switching period (Tp=1/fs) is less than the T_Low threshold but greater than the T_min threshold, the secondary control loop adjusts the Ton_code by a first amount until Tp is between the T_low threshold and the T_high threshold; and
wherein if the Tp is less than the T_min threshold, the secondary control loop adjusts the Ton_code by a second amount until Tp is between the T_low threshold and the T_min threshold;
wherein if Tp is greater than the T_high threshold but less than the T_max threshold, the secondary control loop adjusts the Ton_code by a third amount until Tp is between the T_low threshold and the T_high threshold; and
wherein if the Tp is greater than the T_max threshold, the secondary control loop adjusts the Ton_code by a fourth amount until Tp is between the T_max threshold and the T_high threshold;
wherein current_Ton keeps on being corrected by the fourth amount until Tp is greater than the T_low threshold and less than the T_high threshold; and
wherein the first amount is less than the second amount, and the third amount is less than the fourth amount.

14. The voltage converter of claim 12:
wherein the secondary control loop is configured to generate a switching pulse having a minimum Ton value if the switching frequency (fs) is below a predetermined minimum switching frequency.

15. A voltage converter, comprising:
a power stage configured to generate an output voltage (Vo) and an output current (Io) based on a switching frequency (fs);
a primary control loop configured to vary the switching frequency (fs) in response to a peak output current code (iLpeak_code); and
a secondary control loop configured to generate the iLpeak_code;
wherein the secondary control loop is configured to determine a peak output current (iLpeak_current) based on a switching frequency (fs) of the power stage; and
wherein the secondary control loop is configured to define an T_high threshold and an T_low threshold.

16. The voltage converter of claim 15:
wherein if a switching period (Tp=1/fs) is less than the T_low threshold or greater than the T_high threshold, the secondary control loop adjusts the iLpeak_code by a first amount until Tp is between the T_low threshold and the T_high threshold.

17. The voltage converter of claim 15:
wherein if a switching period (Tp=1/fs) is less than the T_low threshold, the secondary control loop adjusts the iLpeak_code by a first amount until Tp is between the T low threshold and the T_high threshold;
wherein if Tp is greater than the T_high threshold, the secondary control loop adjusts the iLpeak_code by a second amount until Tp is between the T_low threshold and the T high threshold; and
wherein the first and second amounts are different.

18. The voltage converter of claim 15:
wherein the secondary control loop is configured to set a T_max threshold and a T min threshold; and
wherein the T_max threshold is greater than the T_high threshold, and the T_min threshold is less than the T_low threshold.

19. The voltage converter of claim 18:
wherein if a switching period (Tp=1/fs) is less than the T_Low threshold but greater than the T_min threshold, the secondary control loop adjusts the iLpeak_code by a first amount until Tp is between the T_low threshold and the T_high threshold; and wherein if the Tp is less than the T_min threshold, the secondary control loop adjusts the iLpeak_code by a second amount until Tp is between the T_low threshold and the T high threshold;

wherein if Tp is greater than the T_high threshold but less than the T_max threshold, the secondary control loop adjusts the iLpeak_code by a third amount until Tp is between the T_low threshold and the T_high threshold; and wherein if the Tp is greater than the T_max threshold, the secondary control loop adjusts the iLpeak_code by a fourth amount until Tp is between the T_low threshold and the T_high threshold; and wherein the first amount is less than the second amount, and the third amount is less than the fourth amount.

* * * * *